(12) United States Patent
Tsuchino et al.

(10) Patent No.: US 8,713,939 B2
(45) Date of Patent: May 6, 2014

(54) EXHAUST HEAT RECOVERY SYSTEM

(75) Inventors: Kazunori Tsuchino, Tokyo (JP);
Kazuhiko Kawajiri, Tokyo (JP);
Minoru Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 233 days.

(21) Appl. No.: 13/063,474

(22) PCT Filed: Sep. 3, 2009

(86) PCT No.: PCT/JP2009/004343
§ 371 (c)(1),
(2), (4) Date: Mar. 11, 2011

(87) PCT Pub. No.: WO2010/070786
PCT Pub. Date: Jun. 24, 2010

(65) Prior Publication Data
US 2011/0167818 A1    Jul. 14, 2011

(30) Foreign Application Priority Data

Dec. 18, 2008    (JP) ................................. 2008-322263

(51) Int. Cl.
*F01K 23/10*    (2006.01)
*F02G 3/00*    (2006.01)
*F01K 13/00*    (2006.01)
*F01K 25/00*    (2006.01)
*F01K 23/06*    (2006.01)

(52) U.S. Cl.
USPC ................... 60/618; 60/615; 60/616; 60/617; 60/645; 60/651; 60/670; 60/671

(58) Field of Classification Search
CPC ....... F01K 23/065; F01K 25/10; F01K 13/02; F01K 25/00; F01K 13/00; F02G 5/02; F02G 5/00; F02G 5/04; Y02T 10/166
USPC ........................... 60/616–618, 620, 645–681
See application file for complete search history.

(56) References Cited

U.S. PATENT DOCUMENTS 3,512,358 A * 5/1970 Schmidt ........................ 376/391
3,772,879 A * 11/1973 Engdahl ......................... 60/671

(Continued)

FOREIGN PATENT DOCUMENTS

| JP | 60 192809 | 10/1985 |
| JP | 2008 231981 | 10/2008 |
| JP | 2008231981 A * | 10/2008 |

OTHER PUBLICATIONS

Machine translation of JP 2008-231981 A from http://www19.ipdl.inpit.go.jp/PA1/cgi-bin/PA1INDEX attached.*

(Continued)

*Primary Examiner* — Thomas Denion
*Assistant Examiner* — Ngoc T Nguyen
(74) *Attorney, Agent, or Firm* — Oblon, Spivak, McClelland, Maier & Neustadt, L.L.P.

(57) ABSTRACT

In a case of a refrigerant amount being short when a Rankine cycle starts operating, because the pressure difference does not occur across a refrigerant pump, refrigerant cannot be injected from a bypass circuit to the Rankine cycle, and therefore super-cooling degree cannot be controlled. An exhaust heat recovery system is provided that can adjust the super-cooling degree even in the case of the pressure difference not occurring across the refrigerant pump. The system includes a refrigerant tank, for storing refrigerant, which is connected by pipes to the low-pressure circuit side and the high-pressure circuit side of the Rankine cycle through a low-pressure-side valve and a high-pressure-side valve, respectively, and a temperature adjuster for adjusting internal temperature of the refrigerant tank.

13 Claims, 2 Drawing Sheets

(56) References Cited

U.S. PATENT DOCUMENTS

| | | | |
|---|---|---|---|
| 3,797,248 A * | 3/1974 | Witzel et al. | 60/646 |
| 4,148,191 A * | 4/1979 | Frutschi | 60/652 |
| 4,164,848 A * | 8/1979 | Gilli et al. | 60/652 |
| 4,171,617 A * | 10/1979 | Sakamoto et al. | 60/641.8 |
| 4,192,144 A * | 3/1980 | Pierce | 60/641.8 |
| 4,353,214 A * | 10/1982 | Gardner | 60/652 |
| 5,560,210 A * | 10/1996 | Bronicki | 60/648 |
| 5,709,091 A * | 1/1998 | Todack | 62/85 |
| 5,896,746 A * | 4/1999 | Platell | 60/618 |
| 6,629,413 B1 * | 10/2003 | Wendt et al. | 60/655 |
| 6,751,959 B1 * | 6/2004 | McClanahan et al. | 60/670 |
| 6,928,820 B2 * | 8/2005 | Inaba et al. | 60/618 |
| 7,207,379 B2 * | 4/2007 | Takano et al. | 165/202 |
| 7,454,912 B2 * | 11/2008 | Yamanaka et al. | 60/618 |
| 2010/0287920 A1 * | 11/2010 | Duparchy | 60/670 |
| 2011/0192178 A1 * | 8/2011 | Ternel et al. | 62/118 |

OTHER PUBLICATIONS

English translation of JP 2008-231981 A (Oct. 2, 2008).*
International Search Report Issued Dec. 8, 2009 in PCT/JP09/004343 filed Sep. 3, 2009.

* cited by examiner

EXHAUST HEAT RECOVERY SYSTEM

TECHNICAL FIELD

The present invention relates to an exhaust heat recovery system for recovering, by a Rankine cycle, exhaust heat from an internal-combustion engine such as an engine for an automobile to power, etc.

BACKGROUND ART

In a conventional exhaust heat recovery system using a Rankine cycle, because super-cooling degree of operating fluid (hereinafter, referred to as refrigerant) varies during an operation caused by variation of outside air temperature or by fluctuation of condensation capacity of a condenser, a problem has occurred that efficiency of a refrigerant pump decreases. In order to solve this problem, an outlet side of the refrigerant pump and an inlet side of the condenser are communicated together through a bypass passage, and respective open/close valves are also provided at a high pressure side and a low pressure side of the bypass passage; thereby, by suitably opening or closing the open/close valve depending on the super-cooling degree at the outlet side of the condenser, the encapsulated amount of the refrigerant in the Rankine cycle has been controlled (for example, refer to Patent Document 1 and Patent Document 2).

PRIOR ART DOCUMENT

Patent Documents

[Patent Document 1] Japanese Laid-Open Patent Publication S60-192809
[Patent Document 2] Japanese Laid-Open Patent Publication 2008-231981

SUMMARY OF THE INVENTION

Problems to be Solved by the Invention

Regarding such conventional exhaust heat recovery systems, in a steady state where the Rankine cycle operates, by utilizing the pressure difference in the Rankine cycle, the filling amount of the refrigerant in the Rankine cycle is adjusted, whereby the decrease in the efficiency of the refrigerant pump in response to super-cooling-degree variation can be prevented. However, in a case of the refrigerant amount being insufficient when the Rankine cycle starts operating, because the pressure difference has not occurred between the inlet and the outlet of the refrigerant pump (or an expander), the filling amount of the refrigerant in the Rankine cycle cannot be adjusted, whereby the super-cooling degree cannot be controlled. Therefore, inlet refrigerant is vaporized (boiled) at the inlet side of the refrigerant pump, and thereby, due to the refrigerant pump involving air bubbles, a function as a pump has sometimes stopped (that is, the operation of the Rankine cycle has stopped). Accordingly, a problem has occurred that start of operation of the exhaust heat recovery system cannot be normally carried out.

An objective of the present invention, which is made to solve the above described problems, is to provide an exhaust heat recovery system in which decrease in the efficiency of a refrigerant pump due to varying of the super-cooling degree even when a Rankine cycle starts operating is prevented, and by which a suitable operation can be carried out.

Means for Solving the Problem

An exhaust heat recovery system according to the present invention includes a refrigerant-filling-amount adjuster, for adjusting a filling amount of refrigerant in a Rankine cycle, in which the internal temperature of a refrigerant tank for storing the refrigerant is adjusted by a temperature adjuster.

Advantageous Effect of the Invention

According to the present invention, because by using the temperature adjusting means the pressure inside the refrigerant tank can be adjusted by adjusting the temperature inside the refrigerant tank, even if the pressure difference in the Rankine cycle is small, the refrigerant filling amount in the Rankine cycle can be adjusted depending on the super-cooling degree. Therefore, a nonconventional remarkable effect can be obtained that, even in starting of operation of the Rankine cycle, the efficiency of the refrigerant pump can be prevented from decreasing, and an exhaust heat recovery system capable of performing optimized operation can be obtained.

EXPLANATION OF SYMBOLS

Figure 1:
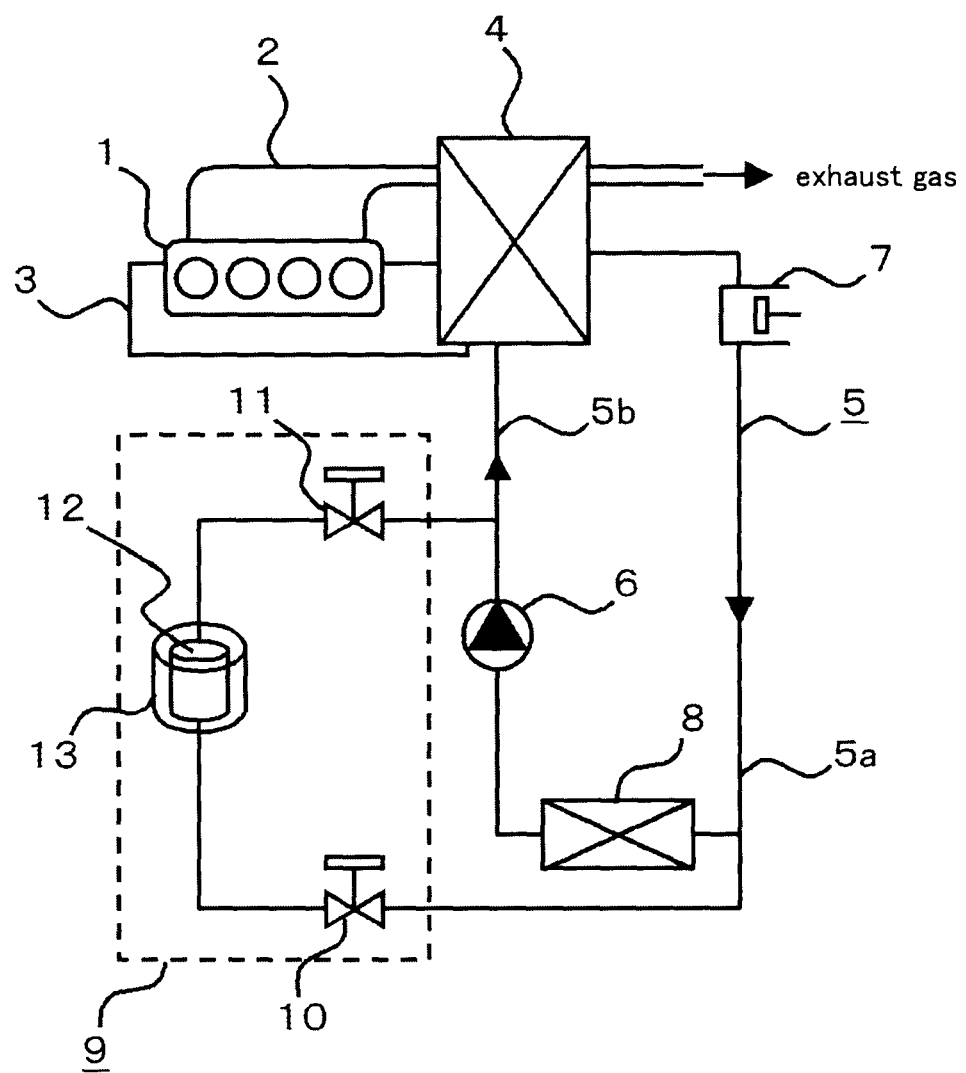
FIG. 1 is a configuration view illustrating an exhaust heat recovery system according to Embodiment 1 of the present invention.

1 Engine (Internal-combustion engine)
5 Rankine cycle
5a Low-pressure circuit portion
5b High-pressure circuit portion
6 Refrigerant pump
7 Expander
8 Condenser
9 Refrigerant-filling-amount adjuster
10 Low-pressure-side valve
11 High-pressure-side valve
12 Refrigerant tank
13 Temperature adjusting-means adjuster
14 Refrigerant pump

MODES FOR CARRYING OUT THE INVENTION

Embodiments of exhaust heat recovery systems according to the present invention are explained by referring to figures. In the following figures, the same symbols represent the same or equivalent components or operations.

Embodiment 1

FIG. 1 is a configuration view representing an exhaust heat recovery system in Embodiment 1 of the present invention. In Embodiment 1, the exhaust heat recovery system according to the present invention is applied to an engine 1 for an automobile (hereinafter, referred to as an engine 1). The engine 1 is an internal-combustion engine that generates driving force for running. An exhaust pipe 2 exhausts combustion gas (exhaust gas) exhausted from the engine 1 to the atmosphere. In a cooling water circuit 3, engine cooling water is circulated by a cooling water pump (not illustrated).

A Rankine cycle 5 is configured with a closed circuit in which a cooling-water/exhaust-gas heat exchanger 4, an expander 7, a condenser 8, and a refrigerant pump 6 are sequentially connected. In this closed circuit, a flow route, along a refrigerant-flow direction, from the expander 7 to the refrigerant pump 6 through the condenser 8 is called as a low-pressure circuit portion 5a, while that from the refrigerant pump 6 to the expander 7 through the cooling-water/exhaust-gas heat exchanger 4 is called as a high-pressure circuit portion 5b.

In Embodiment 1, the cooling-water/exhaust-gas heat exchanger 4 as a configuration element of the Rankine cycle 5 is attached to the exhaust pipe 2 and the cooling water circuit 3. Using this cooling-water/exhaust-gas heat exchanger 4, R134a, as refrigerant for the Rankine cycle 5, pressurized by and transmitted from the refrigerant pump 6 is heated to be vaporized. The vaporized refrigerant generates power in the expander 7, and then the power is consumed by an electric generator (not illustrated) or a power mechanism (not illustrated). The refrigerant after having been expanded is cooled to be condensed by the condenser 8, then liquefied to return to the refrigerant pump 6, and thus the cycle is repeated.

Here, a refrigerant-filling-amount adjuster 9 is explained. A low-pressure-side valve 10 is connected by a pipe to the inlet side of the condenser 8 at the low-pressure circuit portion 5a. This low-pressure-side valve 10 is closed in a steady state. A high-pressure-side valve 11 is connected by a pipe to the outlet side of the refrigerant pump 6 at the high-pressure circuit portion 5b. This high-pressure-side valve 11 is also closed in the steady state. A refrigerant tank 12 is connected by pipes to the low-pressure-side valve 10 and high-pressure-side valve 11. In the refrigerant tank 12, refrigerant whose amount is enough to respond to varying super-cooling degree is stored.

The refrigerant tank 12 is provided with a temperature adjuster 13, by which the internal temperature of the refrigerant tank 12 is adjusted so that, in the steady state where the Rankine cycle 5 operates, the internal pressure of the refrigerant tank 12 becomes higher than that of the low-pressure circuit portion 5a (near the inlet of the condenser 8 in FIG. 1), and lower than that of the high-pressure circuit portion 5b (near the outlet of the refrigerant pump 6 in FIG. 1). Here, when the pressure difference between the low-pressure circuit portion 5a and the high-pressure circuit portion 5b is small in starting the Rankine cycle 5, etc., the internal pressure of the refrigerant tank 12 is not necessarily set to a value between the pressure of the low-pressure circuit portion 5a and that of the high-pressure circuit portion 5b. In such a case, depending on the super-cooling degree detected by a super-cooling-degree grasping unit (not illustrated), the internal temperature of the refrigerant tank 12 may be adjusted so that the internal pressure of the refrigerant tank 12 becomes higher than that of the low-pressure circuit portion 5a, or lower than that of the high-pressure circuit portion 5b.

As the temperature adjuster 13, for example, a method of providing an electric heater to the refrigerant tank 12, a method of heat exchanging cooling water of the engine 1 or exhaust heat of exhaust gas with the refrigerant tank 12, and a heating method using radiation heat, from the engine 1, obtained by arranging the refrigerant tank 12 in the vicinity of the engine 1 may be adopted. The temperature adjuster 13 may constantly produce heat or may produce heat only when the refrigerant is supplied.

The condenser 8 is generally arranged at a front side of an automobile engine room, so that refrigerant is cooled by wind with respect to vehicle speed or by airflow generated by a fan. Therefore, the condensation temperature is greatly affected by outside temperature having a wide fluctuation range. Due to fluctuation of the condensation temperature or that of condensation capacity of the condenser 8, a phenomenon occurs that the super-cooling degree decreases. The super-cooling degree can be easily detected by the super-cooling-degree grasping unit for measuring operation characteristics (for example, an axis torque or the number of rotation) of the refrigerant pump 6 or another unit (for example, the expander 7), or refrigerant operation characteristics (for example, pressure, temperature or density).

In starting the Rankine cycle, when a value of the super-cooling degree, detected by the super-cooling-degree grasping unit, is lower than a predetermined value, the temperature adjuster 13 adjusts the internal temperature of the refrigerant tank 12 so that the internal pressure of the refrigerant tank 12 becomes higher than that of the low-pressure circuit portion 5a. Because the internal pressure of the refrigerant tank 12 is higher than the inlet-side pressure of the condenser 8, by opening the low-pressure-side valve 10, refrigerant can be injected from the refrigerant tank 12 into the Rankine cycle 5 until reaching the predetermined level of the super-cooling degree. On the other hand, in starting the Rankine cycle, when the value of the super-cooling degree, detected by the super-cooling-degree grasping unit is higher than the predetermined value, the temperature adjuster 13 adjusts the internal temperature of the refrigerant tank 12 so that the internal pressure of the refrigerant tank 12 becomes lower than that of the high-pressure circuit portion 5b. Because the internal pressure of the refrigerant tank 12 is lower than the inlet-side pressure of the refrigerant pump 6, by opening the high-pressure-side valve 11, refrigerant can be injected from the Rankine cycle 5 into the refrigerant tank 12 until reaching the predetermined level of the super-cooling degree.

As described above, for example, when the Rankine cycle 5 starts, even in a case in which the pressure difference does not occur between the input and output of the refrigerant pump 6 (or expander 7), by adjusting the internal temperature of the refrigerant tank 12 using the temperature adjuster 13 to adjust the internal pressure of the refrigerant tank 12, the refrigerant filling amount of the Rankine cycle 5 can be adjusted. Thereby, also when the Rankine cycle 5 starts, the super-cooling degree of the refrigerant can be adjusted, and thus the exhaust heat recovery system can be stably operated.

Moreover, in the steady state of the Rankine cycle 5, the internal temperature of the refrigerant tank 12 is adjusted so that the internal pressure of the refrigerant tank 12 becomes higher than the inlet side pressure of the condenser 8 and lower than the outlet side pressure of the refrigerant pump 6. Therefore, a controller (not illustrated) detecting that the super-cooling degree has decreased to lower than the predetermined value operates to open the low-pressure-side valve 10, and thereby the refrigerant in the refrigerant tank 12 can be injected into the Rankine cycle 5 until reaching the predetermined super-cooling degree. While, when the super-cooling degree detected by the super-cooling-degree grasping unit is higher than the predetermined value, by opening the high-temperature-side valve 11, refrigerant can be injected into the refrigerant tank 12 from the Rankine cycle 5, and accordingly the refrigerant in the Rankine cycle 5 is reduced.

Additionally, by providing one-way valves (not illustrated) to the low-pressure-side valve 10 and the high-pressure-side valve 11, the reverse flow can be prevented, and more secure refrigerant filling can be achieved. Here, in Embodiment 1, although the case has been explained in which the low-pressure-side valve 10 is connected to the inlet side of the condenser 8, while the high-pressure-side valve 11 is connected to the outlet side of the refrigerant pump 6, the connecting portions are not limited thereto. Even if the low-pressure-side valve 10 is connected to the outlet side of the condenser 8 (the inlet side of the refrigerant pump 8) in the low-pressure circuit portion 5a, and the high-pressure-side valve 11 is connected to the inlet side of the expander 7 (the outlet side of the cooling-water/exhaust-gas heat exchanger 4) in the high-pressure circuit portion 5b, similar effects can be obtained.

Generally, in an exhaust heat recovery system for recovering exhaust heat of the engine 1 using the Rankine cycle 5, in order to prevent vaporization (boiling) of refrigerant at the inlet side of the refrigerant pump 6, the system is operated, considering a safety margin, at 3-5 degrees C. of the super-cooling degree. In Embodiment 1, because the system includes the super-cooling-degree grasping unit for grasping the super-cooling degree and the refrigerant-filling-amount adjuster 9 which can arbitrarily adjust the refrigerant filling amount, the system can control the super-cooling degree so as to be the minimum value at which the refrigerant at the inlet side of the refrigerant pump 6 does not vaporize. Accordingly, the Rankine cycle 5 can be effectively operated.

According to Embodiment 1, even in a case in which, when the exhaust heat recovery system starts operating, the refrigerant pump 6 cannot operate due to decrease of the super-cooling degree, refrigerant can be injected into the Rankine cycle 5 by the refrigerant-filling-amount adjuster 9. Therefore, the exhaust heat recovery system can be obtained in which, even in the starting operation, the efficiency of the refrigerant pump 6 can be prevented from decreasing, so that a suitable operation can be carried out.

According to Embodiment 1, by adjusting the refrigerant filling amount in the Rankine cycle 5 using the above simple mechanism to control the super-cooling degree, liquid phase fluid (refrigerant) can be surely supplied to the refrigerant pump 6 under a wide operation condition. Therefore, an effective pump operation can be realized, so that a stable Rankine-cycle operation becomes possible.

Moreover, according to Embodiment 1, because a shutdown of the exhaust heat recovery system due to stopping of the refrigerant pump 6 can be prevented, exhaust heat of the engine cooling water can be constantly exhausted from the exhaust heat recovery system, whereby a radiator (not illustrated) provided in the engine cooling water circuit 3 can be omitted.

Embodiment 2

Figure 2:
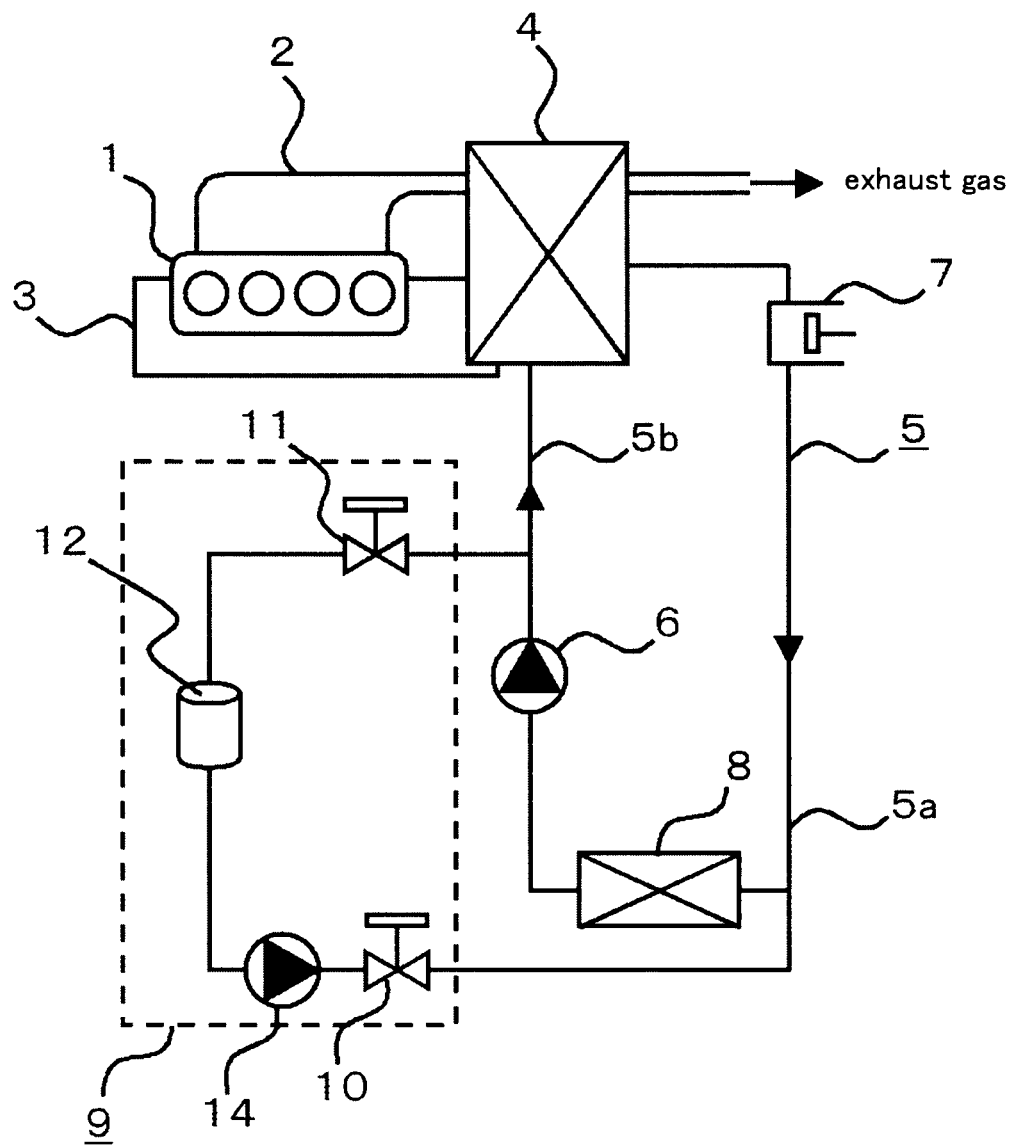
FIG. 2 is a configuration view illustrating an exhaust heat recovery system according to Embodiment 2 of the present invention.

In Embodiment 1, the temperature adjuster 13 is used as the refrigerant filling method from the refrigerant tank 12 to the Rankine cycle 5; however, in Embodiment 2, a refrigerant carrier provided in the refrigerant-filling-amount adjuster 9 is used. FIG. 2 is a configuration view illustrating an exhaust heat recovery system according to Embodiment 2 of the present invention. The refrigerant-filling-amount adjuster 9 according to Embodiment 2 of the present invention is explained referring to FIG. 2. Hereinafter, the system is explained using a refrigerant pump 14 as the refrigerant carrier.

In the low-pressure circuit portion 5a, the low-pressure-side valve 10 is connected to the inlet side of the condenser 8 by the pipe. This low-pressure-side valve 10 is closed in a steady state. The low-pressure-side valve 10 is connected by the pipe through the refrigerant pump 14 to a liquid layer portion of the refrigerant inside the refrigerant tank 12.

When the Rankine cycle starts operating, in a case of a value of the super-cooling degree, detected by the super-cooling-degree grasping unit (not illustrated), being lower than a predetermined value, by opening the low-pressure-side valve 10 and operating the refrigerant pump 14, refrigerant can be injected from the refrigerant tank 12 into the Rankine cycle 5 until reaching the predetermined level of the super-cooling degree. On the other hand, in a case of the value of the super-cooling degree, detected by the super-cooling-degree grasping unit, being higher than the predetermined value, by opening the high-pressure-side valve 11, the refrigerant in the Rankine cycle 5 flows into the refrigerant tank 12, and thereby the super-cooling degree can be adjusted to the predetermined value.

As described above, even in a case, such as starting the Rankine cycle 5, in which pressure difference does not occur between the input and output of the refrigerant pump 6 (or expander 7), by operating the refrigerant pump 14 provided in the refrigerant-filling-amount adjuster 9, the refrigerant filling amount of the Rankine cycle 5 can be adjusted. Thereby, even when the Rankine cycle 5 starts, the super-cooling degree of the refrigerant can be adjusted, and thus the exhaust heat recovery system can be stably operated.

According to Embodiment 2, even in a case in which the refrigerant pump 6 cannot operate due to decrease of the super-cooling degree when the exhaust heat recovery system starts operating, refrigerant can be injected into the Rankine cycle 5 by the refrigerant-filling-amount adjuster 9. Therefore, similarly to Embodiment 1, the exhaust heat recovery system can be obtained in which the efficiency of the refrigerant pump 6 when the operation starts can also be prevented from decreasing, so that a suitable operation can be carried out.

According to Embodiment 2, similarly to Embodiment 1, by adjusting the refrigerant filling amount in the Rankine cycle 5 using the above simple mechanism to control the super-cooling degree, liquid phase fluid (refrigerant) can be surely supplied to the refrigerant pump 6 under a wide operation condition. Therefore, an effective pump operation can be realized, so that a stable Rankine-cycle operation becomes possible.

Moreover, according to Embodiment 2, similarly to Embodiment 1, because a shutdown of the exhaust heat recovery system due to stopping of the refrigerant pump 6 can be prevented, exhaust heat of the engine cooling water can be constantly exhausted from the exhaust heat recovery system, whereby a radiator (not illustrated) provided in the engine cooling water circuit 3 can be omitted.

Embodiment 3

In Embodiment 3, an operation of the exhaust heat recovery system when the Rankine cycle 5 stops operating is explained. The configuration of the exhaust heat recovery system according to Embodiment 3 is similar to that in Embodiment 1 or Embodiment 2; therefore, its explanation is omitted.

In the exhaust heat recovery system according to Embodiment 3, when stopping the Rankine cycle 5, by opening the low-pressure-side valve 10, the refrigerant stored in the refrigerant tank 12 is injected into the Rankine cycle 5, and then the system is stopped. Alternatively, after the Rankine cycle 5 has stopped (while the Rankine cycle 5 is suspended), the refrigerant stored in the refrigerant tank 12 is injected into the Rankine cycle 5. Here, the refrigerant filling amount in the Rankine cycle 5 reaches the maximum value, or a value more than a predetermined amount. Here, the predetermined amount is a refrigerant filling amount at which the Rankine cycle 5 can start to operate (that is, the pressure difference may occur between the input and the output of the refrigerant pump 6).

Accordingly, a sufficient super-cooling degree can be ensured independent of the environmental temperature when the system starts operating, and, by controlling the super-cooling degree simultaneously with the operation of the Rankine cycle 5, an effective operation of the Rankine cycle becomes possible.

According to Embodiment 3, because the Rankine cycle 5 stops after refrigerant has been sufficiently injected therein, when the Rankine cycle starts again, a state does not appear in which the super-cooling degree is not sufficient; therefore, the Rankine cycle 5 can always be normally started, and thereby the exhaust heat recovery system can be obtained whose stability is improved.

INDUSTRIAL APPLICABILITY

As described above, the exhaust heat recovery system according to the present invention has been configured in such a way that the super-cooling degree can be adjusted even when the Rankine cycle starts to operate; therefore, the system is suitable to be used as an exhaust heat recovery system for automobile engines, etc.

What is claimed is:

1. An exhaust heat recovery system for recovering, by using a Rankine cycle, exhaust heat from an internal-combustion engine, the system comprising:
    a refrigerant-filling-amount adjuster for arbitrarily adjusting a filling amount of refrigerant in the Rankine cycle depending on super-cooling degree of the refrigerant in the Rankine cycle, the refrigerant-filling-amount adjuster including:
        a low-pressure-side valve connected to a low-pressure circuit portion of the Rankine cycle,
        a high-pressure-side valve connected to a high-pressure circuit portion of the Rankine cycle, and
        a refrigerant tank, for storing the refrigerant, connected to the low-pressure-side valve and the high-pressure-side valve,
        wherein the internal-combustion engine or an electric heater heats the refrigerant tank to adjust an internal temperature and an internal pressure of the refrigerant tank to inject refrigerant under pressure into an inlet of a condenser at the low-pressure circuit portion of the Rankine cycle.

2. An exhaust heat recovery system as recited in claim 1, wherein the internal-combustion engine or the electric heater adjusts the internal temperature of the refrigerant tank, depending on the super-cooling degree of the refrigerant in the Rankine cycle, so that the internal pressure of the refrigerant tank becomes higher than a pressure of the low-pressure circuit portion or lower than a pressure of the high-pressure circuit portion.

3. An exhaust heat recovery system as recited in claim 1, wherein the Rankine cycle includes the condenser and a refrigerant pump, the low-pressure-side valve is connected to the inlet side of the condenser, and the high-pressure-side valve is connected to an outlet side of the refrigerant pump.

4. An exhaust heat recovery system as recited in claim 1, wherein the Rankine cycle includes a refrigerant pump and an expander, the low-pressure-side valve is connected to an inlet side of the refrigerant pump, and the high-pressure-side valve is connected to an inlet side of the expander.

5. An exhaust heat recovery system as recited in claim 1, wherein the refrigerant stored in the refrigerant tank is injected into the Rankine cycle when the Rankine cycle stops operating or while it is suspended, depending on an initial super-cooling degree that is required when the Rankine cycle starts operating from a stopped state or resumes operating from a suspended state.

6. An exhaust heat recovery system as recited in claim 5, wherein when the Rankine cycle stops operating or while it is suspended, the internal-combustion engine or the electric heater heats the refrigerant tank and increases the internal pressure of the refrigerant tank to inject refrigerant under pressure into the low-pressure circuit portion of the Rankine cycle when the super-cooling degree of the refrigerant in the Rankine cycle is below the initial super-cooling degree that is required when the Rankine cycle starts operating from the stopped state or resumes operating from the suspended state.

7. An exhaust heat recovery system as recited in claim 1, wherein the internal-combustion engine heats the refrigerant tank, and
    wherein the refrigerant tank is located in a position relative to the internal combustion engine permitting absorption of radiation heat from the internal combustion engine to adjust the internal temperature and the internal pressure of the refrigerant tank.

8. An exhaust heat recovery system as recited in claim 1, wherein the electric heater heats the refrigerant tank.

9. An exhaust heat recovery system for recovering, by using a Rankine cycle, exhaust heat from an internal-combustion engine, the system comprising:
    a refrigerant-filling-amount adjuster for arbitrarily adjusting a filling amount of refrigerant in the Rankine cycle depending on super-cooling degree of the refrigerant in the Rankine cycle, the refrigerant-filling-amount adjuster including:
        a low-pressure-side valve connected to a low-pressure circuit portion of the Rankine cycle,
        a high-pressure-side valve connected to a high-pressure circuit portion of the Rankine cycle,
        a refrigerant pump connected to the low-pressure-side valve on a first side of the low-pressure-side valve opposite to a second side of the low-pressure-side valve connected to the low-pressure circuit portion of the Rankine cycle to connect the refrigerant pump to an inlet side of a condenser of the Rankine cycle, and
        a refrigerant tank, for storing the refrigerant, connected to the refrigerant pump and the high-pressure-side valve.

10. An exhaust heat recovery system as recited in claim 9, wherein the Rankine cycle includes the condenser and a refrigerant pump, and the high-pressure-side valve is connected to an outlet side of the refrigerant pump of the Rankine cycle.

11. An exhaust heat recovery system as recited in claim 10, wherein the Rankine cycle includes a refrigerant pump and an expander, the low-pressure-side valve is connected to an inlet side of the refrigerant pump of the Rankine cycle, and the high-pressure-side valve is connected to an inlet side of the expander.

12. An exhaust heat recovery system as recited in claim 9, wherein the refrigerant stored in the refrigerant tank is injected into the Rankine cycle by the refrigerant pump when the Rankine cycle stops operating or while it is suspended, depending on an initial super-cooling degree that is required when the Rankine cycle starts operating from a stopped state or resumes operating from a suspended state.

13. An exhaust heat recovery system as recited in claim 12, wherein when the Rankine cycle stops operating or while it is suspended, the refrigerant pump injects refrigerant stored in the refrigerant tank into the inlet side of the condenser of the Rankine cycle in the low-pressure circuit portion of the Rankine cycle when the super-cooling degree of the refrigerant in the Rankine cycle is below the initial super-cooling degree that is required when the Rankine cycle starts operating from the stopped state or resumes operating from the suspended state.

* * * * *